John L. Raymond
Eugenio G. Giambro
Ernest W. Jacobus, Jr.
INVENTORS

BY Clarence A. O'Brien
and Harvey B. Jacobson
Attorneys

July 8, 1952 J. L. RAYMOND ET AL 2,602,863

TELEPHONE RECEIVER HOLDER

Filed Oct. 21, 1948 2 SHEETS—SHEET 2

John L. Raymond
Eugenio G. Giambro
Ernest W. Jacobus, Jr.
INVENTORS

BY Clarence A. O'Brien and Harvey B. Jacobson
Attorneys

Patented July 8, 1952 2,602,863

UNITED STATES PATENT OFFICE 2,602,863

TELEPHONE RECEIVER HOLDER

John L. Raymond and Eugenio G. Giambro, Brooklyn, N. Y., and Ernest W. Jacobus, Jr., East Orange, N. J.

Application October 21, 1948, Serial No. 55,762

2 Claims. (Cl. 179—151)

This invention relates generally to a telephone receiver holder, and more particularly to a holder having a base which may be placed on a desk or table and supports a standard of unique design carrying a jointed arm with a specially designed receiver holder.

A primary object of this invention is to provide means for suspending a telephone receiver in position so that persons may have full freedom of both hands while using the telephone.

Another object of this invention is to provide a telephone receiver holder which incorporates an extensible standard designed particularly for such use, and the ratchet joint for securing an adjustable arm to the standard, the frictional coefficients of the different joints in the device being so arranged that only certain desired joints will flex during normal manipulation of the receiver, so that the user may adjust the device to his particular needs.

Another object of this invention is to provide a device of this character in which the base and other portions of the device are so proportioned as to prevent imbalance or non-stability of the device during use.

Still another object of this invention is to provide a device of this character which may be used with the standard telephone set without alteration of the latter, and which may be very quickly attached to a telephone receiver.

Yet another object of this invention is to provide an extensible standard, a ratchet joint and a clamp which have novelties per se in their construction, being specially designed for the purpose of use in this invention and in cooperation with each other.

And a last object to be mentioned specifically is to provide a telephone receiver holder which is relatively inexpensive and practicable to manufacture, which is safe, simple and convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Similar characters of reference designate similar or identical elements and portions throughout the specification and throughout the different views in the drawings.

Figures 1, 3:
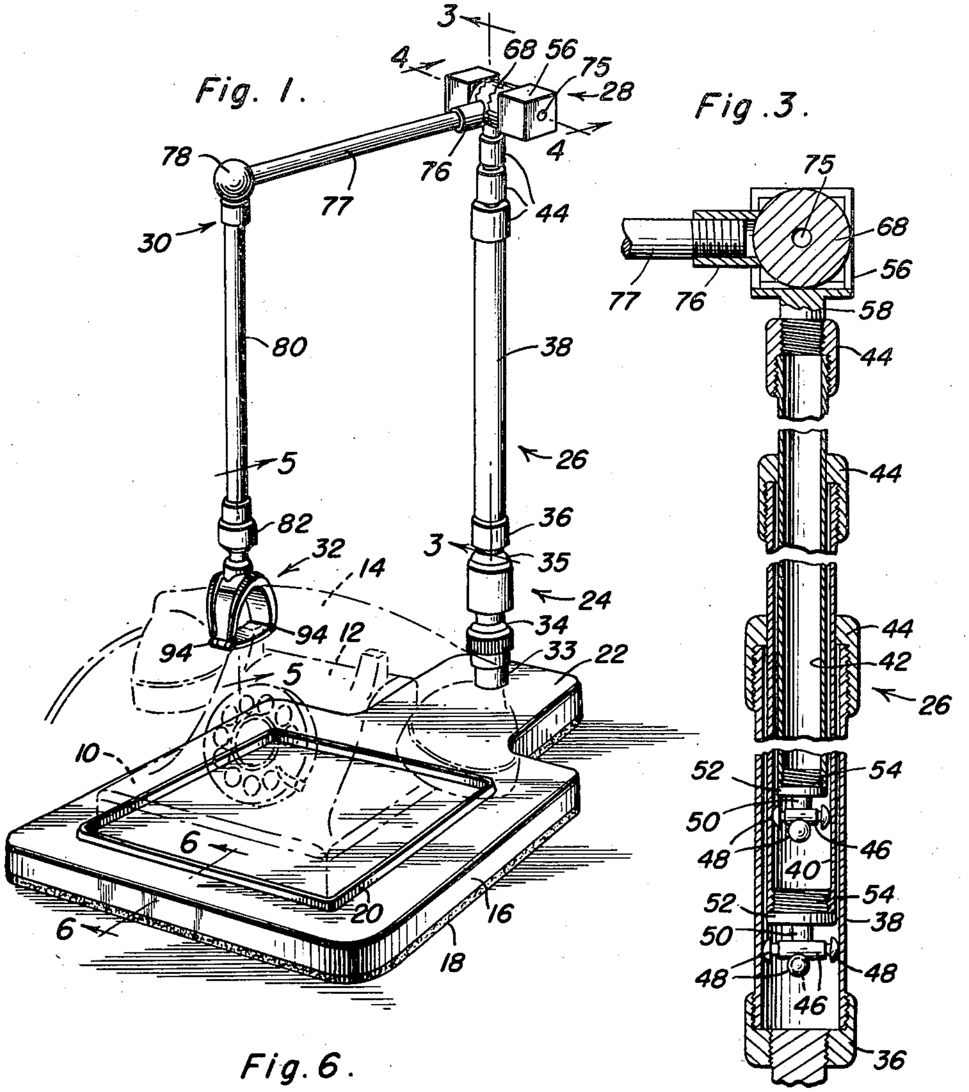
Figure 1 is a three dimensional view of this invention shown operatively associated with a telephone receiver set, the receiver of the set being in the cradle and the device being fully collapsed.
Figure 3 is an enlarged vertical sectional view of a portion of the standard, with portions of the ratchet joint and the jointed arm, the view being taken substantially upon the line 3—3 in Figure 1.
Figure 6:
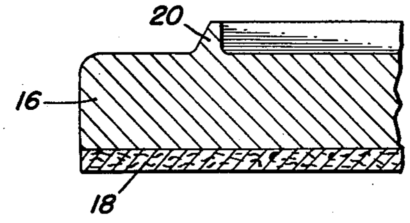
Figure 6 is an enlarged vertical sectional view, fragmentary in character taken on the line 6—6 in Figure 1 and showing the construction of the base.
Figure 2:
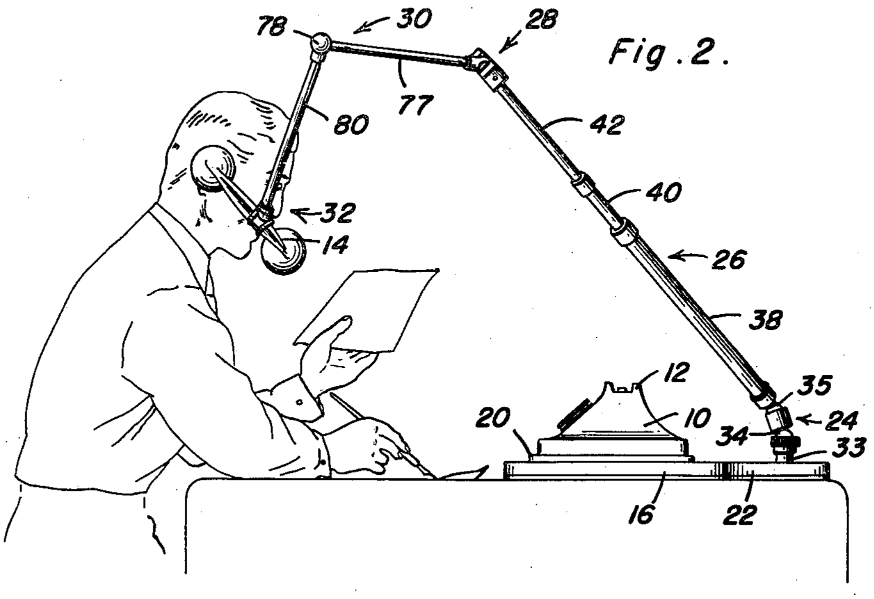
Figure 2 is a side elevational view of the structure shown in Figure 1 but with the standard and jointed arm in a position assumed when being used.

Referring now to the drawings in detail, this invention is adapted to be used with an environment including a telephone set 10 having a cradle 12 and a portion which will be referred to as the receiver 14.

It is proposed by this invention to provide a generally rectangular base 16 of considerable mass and having a felt base pad 18, a superficial recess for the set 10 which will preferably be bounded by a rail 20, and the base is extended on one side as at 22. The main portions of this invention may be regarded as including a double universal joint assembly 24, an extensible standard 26, a ratchet joint assembly 28, a jointed arm 30 and a clamp 32 for the receiver 14. As the term implies, the double universal joint 24 may include two ball joints 34 and 35, the lower ball joint 34 being connected by a short pipe or shaft 33 to the extending portion 22, and the upper ball joint 35 is associated with an upwardly extending threaded stud on which is mounted a double threaded adapter coupling 36.

The extensible standard 26 is comprised of an outer tube 38, an intermediate tube 40 and an inner tube 42 telescopically associated and terminally threaded for connection respectively with the threaded coupling 36 and three threaded bushings 44 which are configurated to function as stop members limiting the expansion and contraction of the tubes within each other. The intermediate and inner tubes 40 and 42 are each provided with screw-in plugs 54 having enlarged discs 52 adapted to abut the ends of the said last mentioned tubes within the next adjacent tube, and neck members carrying diametrically disposed pairs of cylinders 46 in which are spring biased plungers 48 with enlarged heads adapted to frictionally engage the inner or bore surfaces of the outer tube 38 and intermediate tube 40, it being understood that the springs urging the plungers outwardly are compressed between the inner ends of the plungers and within the cylinders 46, it being thought unnecessary to detail this structure in the drawings.

Figure 4:
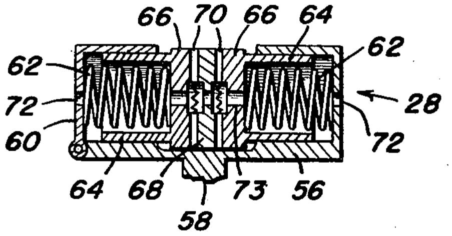
Figure 4 is an enlarged vertical sectional view of the ratchet joints, taken substantially on the line 4—4 in Figure 1.
Figure 5:
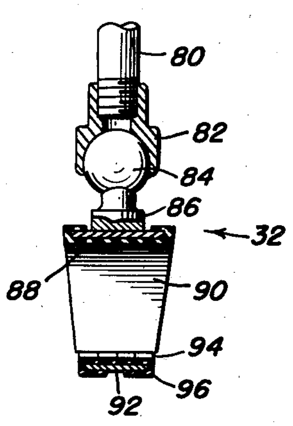
Figure 5 is an enlarged fragmentary detail vertical sectional view of the clamp, the view being taken substantially on the line 5—5 in Figure 1 and including certain portions of the arm carrying the clamp.
Figure 7:
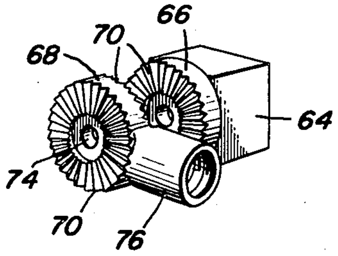
Figure 7 is a grouped view, in perspective, of portions of the ratchet joint.

The ratchet joint 28 is comprised of a box casing 56 connected by means of a neck member 58 with the outermost of the threaded bushings 44 on the outer end of the inner tube 42. The casing is elongated and may be substantially square in cross section and one end of the casing is provided with a gate 60 pivoted on one side of the casing and having three panel sides and an end panel so that when the ratchet joint is fully assembled, this last mentioned end of the casing has substantially the same appearance as the other end of the casing. A coiled spring is mounted in each end of the casing, as best illustrated at 62 in Figure 4. A pair of hollow plungers 64 are mounted for longitudinal sliding movement within the casing, one plunger being disposed on each side of a disc 68 which is provided with ratchet teeth 70 on each side thereof, to coact with ratchet teeth denoted by the same reference numeral 70 on the closed end portions 66 of the plungers, these closed end portions being also represented as of disc form. The end of the casing, the discs 66 and the disc 68 are all axially apertured, as indicated at 72, 73 and 74 to receive a clamping bolt 75, whereby the gate 60 is held in position to retain the different parts of the ratchet joint in proper cooperative positions. The disc 68 carries a threaded adapter 76 for securement to the portion 77 of the jointed arm 30. The portion 77 is connected to a similar portion 80 by a universal joint 78 of any suitable design and the other end of the portion 80 is also provided with a universal joint 82 having a ball 84. On one side of the ball 84 is a neck member 86 which is rigidly mounted, as by welding or the like on a saddle 88 connected to a clamp 32, the neck portion 86 being directly connected to the saddle 88, best illustrated in Figures 1 and 5.

In order that the finish of the receiver 14 may not be damaged, the saddle 88 is lined with a resilient lining 90 of rubber or the like having turned edges engaging the edge portions of the saddle 88. A cross member 92 is pinned terminally, as indicated at 94 to the arms of the saddle 88, one of the pins being easily removable so as to facilitate the detachment and removal of the receiver 14 from the clamp 32. A second liner 96 of resilient material such as rubber will be mounted upon the cross member 92.

The operation of this invention will be clearly understood from a consideration of the foregoing description of the mechanical details thereof, taken in connection with the drawings and with the above recited objects of the invention. It should be particularly noted that the ratchet joint 28 is adjustable within fairly wide limits, and that the coefficient of friction provided in this ratchet joint will ordinarily be of a higher order than the coefficient of friction in the universal joints at the base of the standard 26 and in the jointed arm 30. All these joints are such that the receiver may be held reasonably firmly against the ear of the user.

Obviously miner variations may be made in the proportionment and exact constructional details of this invention without departure from the spirit thereof, and the scope of this invention should be determined only as limited by the appended claims.

Having described the invention, what is claimed as new is:

1. A telephone receiver holder comprising a base, an extensible standard, an arm having at least one universal joint carried by the standard, a telephone receiver clamp on the free end of the arm, said standard being connected to the base by a universal joint, said arm including a ratchet joint connection with said standard having a higher coefficient of friction than either of said universal joints, said ratchet joint including a casing fixed on said standard, a disc carried by said arm and disposed transversely and centrally of said casing, a pair of spring biased plungers one on each side of the disc within the casing, said plungers and disc having cooperating ratchet faces.

2. A telephone receiver holder comprising a base, an extensible standard, an arm having at least one universal joint carried by the standard, a telephone receiver clamp on the free end of the arm, said standard comprising a plurality of telescoping tubes including a smaller diameter tube and larger diameter tubes, cylinders with diametrically disposed plungers frictionally contacting the interior surfaces of said larger diameter tubes, and plugs having their inner ends threadedly removably securable in said smaller diameter tube and in at least one of said larger diameter tubes, said cylinders being secured on the outer ends of said plugs and diametrically of said plugs.

JOHN L. RAYMOND.
EUGENIO G. GIAMBRO.
ERNEST W. JACOBUS, Jr.

REFERENCES CITED

The following references are of record in the file of this patent:

UNITED STATES PATENTS

| Number | Name | Date |
|---|---|---|
| 936,438 | FitzGerald | Oct. 12, 1909 |
| 963,913 | Lyhne | July 12, 1910 |
| 1,319,774 | Kallajian | Oct. 28, 1919 |
| 1,358,506 | Bensberg | Nov. 9, 1920 |
| 1,454,864 | Schaake | May 15, 1923 |
| 1,919,114 | Ley | July 18, 1933 |
| 2,453,967 | Browne | Nov. 16, 1948 |

FOREIGN PATENTS

| Number | Country | Date |
|---|---|---|
| 31,804 | Denmark | June 4, 1921 |
| 394,955 | France | Feb. 6, 1909 |
| 655,107 | France | Apr. 13, 1929 |